(12) United States Patent
Kitoh et al.

(10) Patent No.: US 6,379,840 B2
(45) Date of Patent: *Apr. 30, 2002

(54) LITHIUM SECONDARY BATTERY

(75) Inventors: Kenshin Kitoh, Nagoya; Teruhisa Kurokawa, Aichi-prefecture, both of (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,921

(22) Filed: Mar. 10, 1999

(30) Foreign Application Priority Data

Mar. 18, 1998 (JP) ............................................. 10-068017
Jun. 18, 1998 (JP) ............................................. 10-171105

(51) Int. Cl.[7] .......................... H01M 4/02; H01M 4/00; H01M 2/26; H01M 2/28

(52) U.S. Cl. .......................... 429/211; 429/94; 429/161

(58) Field of Search ............................. 429/211, 94, 161

(56) References Cited

U.S. PATENT DOCUMENTS

| 3,884,715 | A | * | 5/1975 | Gay et al. .................... 429/103 |
| 5,154,993 | A | * | 10/1992 | Beatty ........................ 429/211 |
| 5,736,270 | A | * | 4/1998 | Suzuki et al. ................. 429/94 |
| 6,030,726 | A | * | 2/2000 | Takeuchi et al. ......... 429/231.8 |

* cited by examiner

*Primary Examiner*—Stephen Kalafut
*Assistant Examiner*—Julian A. Mercado
(74) *Attorney, Agent, or Firm*—Burr & Brown

(57) ABSTRACT

A lithium secondary battery includes a battery case, an internal electrode body contained in the battery case and including a positive electrode, a negative electrode and a separator made of porous polymer. The positive electrode and the negative electrode are wound or laminated so that the positive electrode and negative electrode are not brought into direct contact with each other via the separator. The respective resistance value of multiple tabs for electricity collection to be connected to the positive electrode and negative electrode was set to remain within the range of ±20% of the average resistance value of the tabs. The lithium secondary battery maintains a good charge-discharge characteristic even during high-output cycle operation and in particular may be preferably used for a drive motor of an electric vehicle.

6 Claims, 6 Drawing Sheets

LITHIUM SECONDARY BATTERY

BACKGROUND OF THE INVENTION AND RELATED ART STATEMENT

The present invention relates to a lithium secondary battery which maintains a good charge-discharge characteristic even during a high output cycle operation and which in particular may be preferably used for a drive motor of an electric vehicle.

In recent years, it is eagerly desired to regulate the emissions of carbon dioxide with the environment protection movement. In the automobile industry, to replace automobiles using fossil fuels, such as vehicles driven by gasoline, there is a movement to promote the introduction of electric vehicles (EV) and hybrid electric vehicles (HEV) A lithium secondary battery acting as a motor-drive battery acting as a key for putting EV and HEV into practical use is required to have not only a huge battery capacity but also a huge battery output, which greatly affects the acceleration performance as well as the slope-climbing performance of the vehicle.

In general, the internal electrode body of a lithium secondary battery has a positive electrode, a negative electrode and a separator made of porous polymer film, the positive electrode and the negative electrode being wound or laminated so that the positive electrode and negative electrode are not brought into direct contact with each other via the separator. For example, as shown in FIG. 1, an internal electrode body 1 of a winding type is formed by winding a positive plate 2 and a negative plate 3 having a separator 4 in between, and a tab 5 is provided for each of the positive and negative electrode plates 2, 3 (hereafter referred to as "electrodes 2, 3") respectively. The end opposite to the end connected to the electrodes 2, 3 of each tab 5, is attached to an external terminal 11 or an electric current extracting terminal 13 such as an internal terminal member 12 being electrically connected to the external terminal 11. That is, the tab 5 serves as a lead line which is electrically connected to the electric current extracting terminal 13 while conducting electricity collection from the electrodes 2, 3.

Here, a plan view of the electrodes 2, 3 when the internal electrode body 1 is spread out is shown in FIG. 2. The electrodes 2, 3 are formed with an electrode active material 16 coated respectively onto metal foils 15 made of aluminum, etc., for the positive electrode 2 and made of copper, etc., for the negative electrode 3. Since a tab 5 is provided on a side of such metal foil 15, a tab having a thin band shape is preferably used. The tabs are disposed at approximately a uniform distance so that each tab 5 conducts electricity collection in a constant area in electrode 2, 3. Incidentally, in general, the material qualities of the tabs 5 are the same as the material qualities of the metal foil 15 to which the tabs 5 are attached.

With respect to a lithium secondary battery for EV or HEV, there are cases in which a current equal to or more than 100 A flows per battery. In the case where such a huge current flows, there is a need for the internal resistance of all the batteries to be made as low as possible in order to reduce the output loss of the batteries.

Therefore, it goes without saying that it is preferred to make the resistance of the internal electrode body low, but now, paying attention to the connection path from the formerly-described internal electrode body 1 to an electric current extracting terminal 13, it is preferable that the resistance of the members of metal foil 15, tab 5 and electric current extracting terminal 13 be low. However, concerning the metal foil 15 and electric current extracting terminal 13, there is a certain limit to making the resistance value lower due to the fact that the material is limited as well as due to limitations from the point of view of the shape of the battery and energy density.

On the other hand, the tab 5 has an allowable range in which to set a resistance value from the point of view of the feasibility of setting its shape freely since the shape of tab 5 is to be housed in the space between the battery case housing the internal electrode body 1 therein and the internal electrode body 1. In addition, concerning the tabs 5 and the metal foil 15, the connection resistance of these does not vary much, since they are unified by welding, except for with extremely faulty welding. Concerning the connection between the tabs 5 and the electric current extracting terminal 13, however, there is room left to reduce the contact resistance, since various methods may be considered. For example, for tabs with the shape of a thin band, a method of bundling by piling up in one direction is preferably easiest in terms of a forming process for the battery, and also is preferred since the structure inside the battery will not become complicated. In this case, however, there will be a need to aim to reduce the contact resistance on the contact surface of each tab, since contact between tabs will occur more times.

Concerning the tabs 5 and the method used to connect the tab 5 to the electric current extracting terminal 13, however, the resistance of these members themselves and the connection resistance, which did not occupy a larger percentage from the view point of internal resistance of the entire battery, were not considered to be important, and how the dispersion (distribution) of this resistance may affect the output characteristic or charge-discharge cycle operation characteristic has not been explained.

SUMMARY OF THE INVENTION

The present invention was achieved by considering the problems of the prior art mentioned above. That is, according to the present invention, there is provided a lithium secondary battery, comprising a battery case, an internal electrode body contained in the battery case and including a positive electrode, a negative electrode and a separator made of porous polymer, the positive electrode and the negative electrode being wound or laminated so that the positive electrode and negative electrode are not brought into direct contact with each other via the separator, and at least plural tabs, having been connected to the positive electrode and negative electrode for electricity collection so that the respective resistance value of each tab remains within the range of ±20% of the average resistance value of the tabs.

In a lithium secondary battery of the present invention, it is preferred that all the tabs are concentrated at one place and are connected to the electric current extracting terminal by crimping or welding. In addition, it is also preferred that all the tabs are connected to the electric current extracting terminal by crimping, or welding, or screwing after they have been unified by crimping, welding, or eyelet-type connecting in advance. Incidentally, the thickness of a tab is preferably 5 μm or more and 100 μm or less, and the battery structure using such tabs is preferably adopted to a lithium secondary battery with a battery capacity of 5 Ah or more, and especially to a lithium secondary battery for an EV or a hybrid electric vehicle.

DETAILED DESCRIPTION OF PREFERRED EMBODIMENT

The lithium secondary battery of this invention yields an excellent effect in that it is possible to discharge a huge electric current constantly, enabling uniform electricity collection from the positive electrode and negative electrode together with a uniform battery reaction within the positive electrode and negative electrode, since the resistance from the positive and negative electrodes to the electric current extracting terminal is made uniform. As a result of this, it also yields another excellent effect in that local deterioration of battery materials may be suppressed and thus excellent endurance may be provided during cycle operations.

While the embodiments of the present invention are described below, it goes without saying that the present invention is not limited to the following embodiments.

Figure 1:
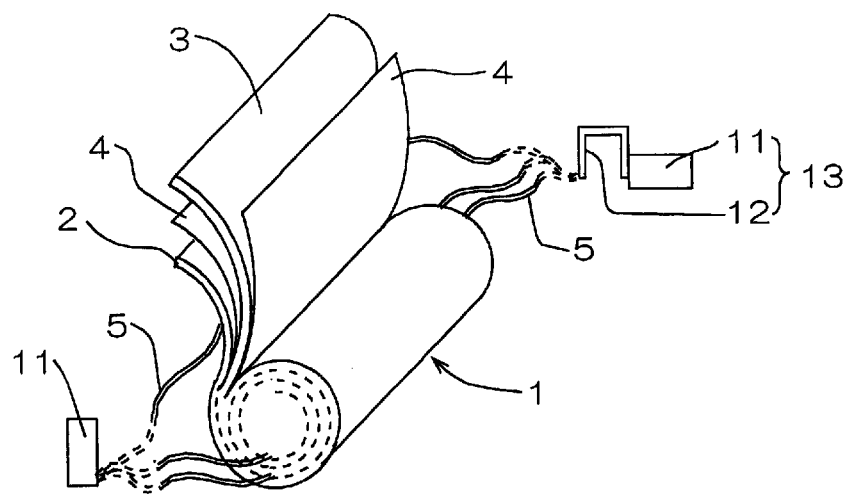
FIG. 1 is a perspective view showing the structure of a wound-type internal electrode body.

The internal electrode body of the lithium secondary battery of the present invention (hereinafter referred to as a "battery") is constituted by a positive electrode, a negative electrode and a separator made of porous polymer film, the positive electrode and the negative electrode being wound or laminated so that the positive electrode and negative electrode are not brought into direct contact with each other via the separator. In particular, as shown in FIG. 1 before, an internal electrode body 1 of a winding type is formed by winding a positive electrode 2 and a negative electrode 3 having a separator 4 in between, and tabs 5 are provided for electrodes 2, 3.

Figure 3:
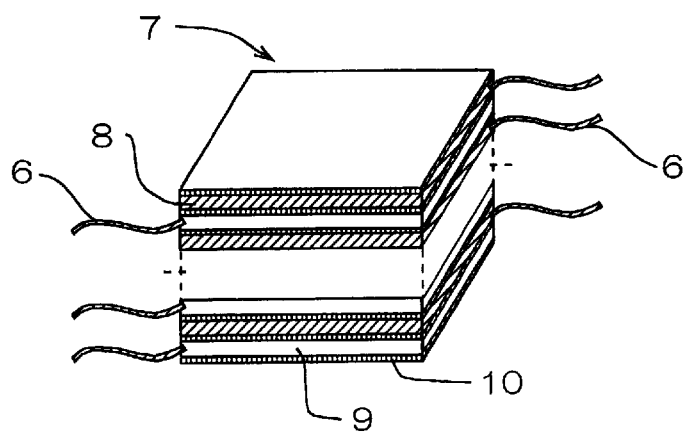
FIG. 3 is a perspective view showing one embodiment of the structure of a lamination-type internal electrode body.

On the other hand, as shown in FIG. 3, the lamination-type internal electrode body 7 laminates the positive plate 8 and the negative plate 9 alternately via the separator 10 with tabs 6 being connected to the positive and negative electrodes plates 8 and 9 (hereinafter referred to as "electrodes" 8, 9) respectively. Such an internal electrode body 1, 7 is basically configured to have a plurality of element batteries being connected in parallel, an element battery consisting of positive electrodes 2, 8 and negative electrodes 3, 9 facing each other.

The positive electrodes 2, 8 and the negative electrodes 3, 9 are formed in the shape of a thin plate with an electrode active material being coated respectively onto metal foil as base materials. Here, aluminum foil is used as the base material for the positive electrodes 2, 8, and copper foil as the base material for the negative electrodes 3, 9 respectively.

For a battery with any of the above-described structures, lithium transition metal compound oxides such as lithium cobalt oxide($LiCoO_2$), lithium nickel oxide($LiNiO_2$), or lithium manganese oxide ($LiMn_2O_4$), etc., are generally used as positive active materials. In addition, in order to improve the conductivity of these positive active materials, a carbon powder such as acetylene black, graphite powder, etc., is frequently mixed with the electrode active material. On the other hand, as the negative active materials, an amorphous carbon material such as soft carbon or hard carbon, or carbon powder such as natural graphite, etc., is used.

As a separator 4, 10, it is preferable to use a three-layer structural one in which a polyethylene film having lithium ion permeability and including micropores is sandwiched between porous polypropylene films having lithium ion permeability. This serves also as a safety mechanism with which, when the temperature of the internal electrode body is raised, the polyethylene film is softened at about 130° C. so that the micropores collapse to suppress the movement of lithium ions, that is, battery reaction. With this polyethylene film being sandwiched between the polypropylene films having a softening temperature higher than the polyethylene film, it is possible to prevent contact/welding between the electrodes (2, 3), and (8, 9).

Figure 2:
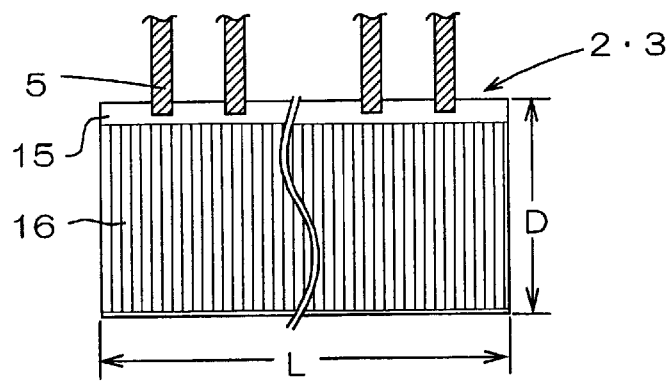
FIG. 2 is a plan view showing the spread state of each positive electrode and negative electrode in a wound-type internal electrode body.

Next, the method of connection between the tabs and the internal electrode body (positive electrodes and negative electrodes) as well as the electric current extracting terminal will be explained using the case of a wound-type internal electrode body 1 as an example. As described before, FIG. 2 is a plan view of the electrodes 2, 3 when a wound-type internal electrode body 1 shown in FIG. 1 is spread out, wherein in the case of the battery capacity being constant, the length L toward its winding direction can be shortened if the width D of the electrodes 2, 3 is lengthened.

However, in the case where the width D of the electrodes 2, 3 is long, there arises an inconvenience in that the internal resistance becomes large since the distance between the tabs 5 and the electrode active material 16 in the vicinity of a side facing the side where the tabs 5 are attached becomes long. Therefore, normally the width of the electrodes 2, 3 is preferably set within the range from 10 cm to 40 cm, and when the width of the electrodes 2, 3 is within such a range, the number of tabs 5 to be placed along the length L toward the winding direction of electrode 2, 3 is preferably around 6 to 10 per 1 m.

Figure 11:
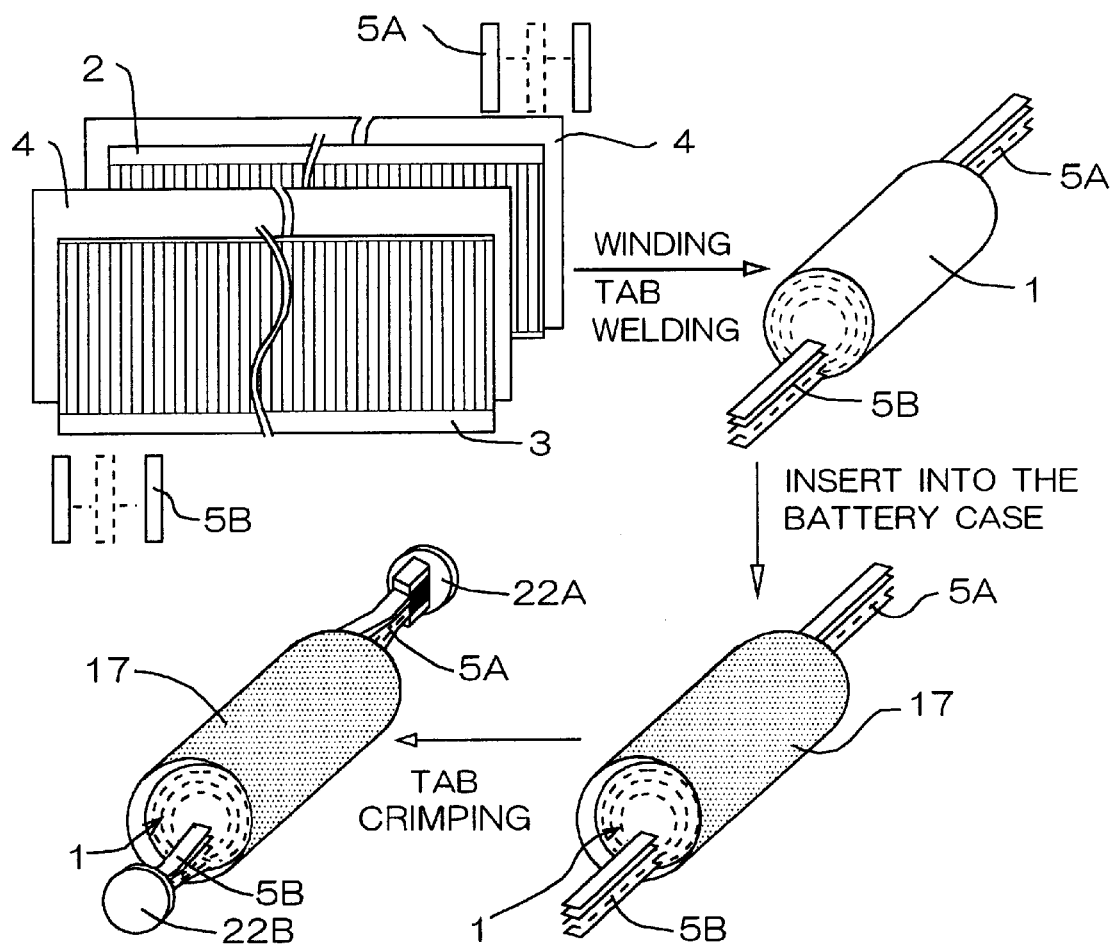
FIG. 11 is an explanatory drawing showing the process up to tab connection to an electric current extracting terminal in forming a lithium secondary battery of the present invention.

The tabs 5 (tab 5A and tab 5B in FIG. 11) are preferably arranged to make an approximately straight line toward the direction of the diameter of the internal electrode body 1 when the electrodes 2, 3 are wound, so that arrangement of the tabs 5 to the electrode 2, 3 is not configured to have a complicated structure as shown in FIG. 11 to be described below, but is easily attachable to the electric current extracting terminal 13.

As a method for connecting the electrodes 2, 3 to the tabs 5, resistance welding or ultrasonic welding may be used. There are no cases where the contact resistance between the tabs 5 and the electrode 2, 3 will become large except in the case of extremely faulty welding. However, it goes without saying that it is preferred to make the contact resistance between the tabs 5 and the electrodes 2, 3 to be approximately constant.

Thus, the tabs 5 disposed approximately at an almost equal distance respectively serve to transfer electrons having a relationship to the battery reaction in an approximately equal electrode area of the electrodes 2, 3. However, if there is any dispersion in resistance from the electric current extracting terminal 13 to the respective tabs 5, there will arise dispersion in extraction of electricity as well. That is, there is a possibility that electricity will be concentrated in low resistance tabs 5, and in this case, not only will the battery reaction be uneven, but also a problem will arise in that rapid deterioration of material will take place at the portions where the battery reaction will be most active (at the portions where the low resistance tabs 5 are connected).

In order to avoid such a problem, according to the present invention, the plural tabs 5, having been connected to each electrode 2, 3 for electricity collection, are designed so that the respective resistance values of tabs 5 at least remain within the range of ±20% of the average resistance value of the tabs 5. Due to this, it is preferred that all the tabs 5 are concentrated at one place and are connected to the electric current extracting terminal 13 by crimping or welding.

Figure 4:
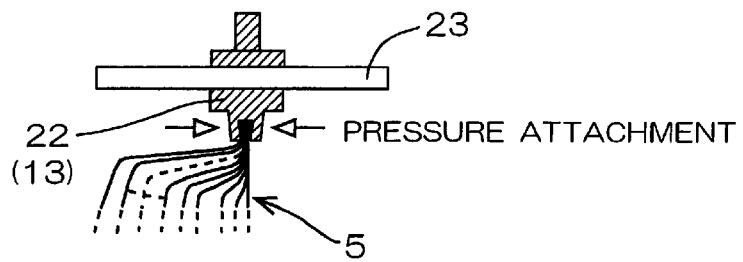
FIG. 4 is a cross-sectional view showing one embodiment of a method used to connect tabs to an electric current extracting terminal according to the lithium secondary battery of the present invention.

In particular, as shown in FIG. 4, it is possible to use a rivet 22 as an electric current extracting terminal 13 to be attached to the battery cap 23, and to collect the tabs 5 to connect to the rivet 22 by crimping. In this case, based on the pressure used for the crimping, the resistance value of the tabs 5 can be within the above-described range. Incidentally, the tabs 5 may be connected to the rivet 22 by welding instead of crimping, or the tabs 5 may be pressed into contact with the rivet 22 and the connection part may be unified further by welding.

Figure 5:
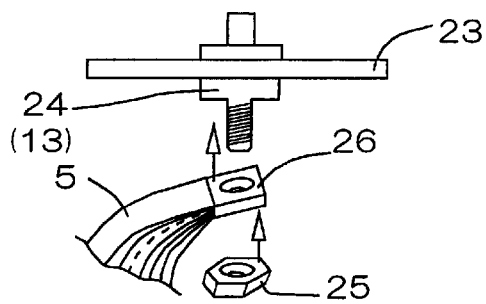
FIG. 5 is an explanatory drawing showing another embodiment of a method used to connect tabs to an electric current extracting terminal according to the lithium secondary battery of the present invention.

In addition, as shown in FIG. 5, using metal plates 26 such as copper plates, aluminum plates and the like, all the tabs 5 are unified by crimping in advance, and thereafter fitted onto the bolt 24 which is an electric current extracting terminal 13 and there are screwed tightly by a nut 25, a connection method that is used preferably. Incidentally, for unification of the tabs 5, in addition to crimping, a method such as welding or eyelet-type connecting may be employed, and for attaching the unified tabs 5 to the electric current extracting terminal 13, methods such as welding as well as crimping may be employed.

Now, as described before, since metal foils are used as the base material for the electrodes 2, 3, tabs 5 in a thin band shape are preferably used as well, the thickness of which are preferred to be equal to or more than 5 $\mu$m and equal to or less than 100 $\mu$m. Here, in the present invention, aluminum foils are preferably used for the positive tabs and copper or nickel foils are preferably used for the negative tabs.

Incidentally, since connection points between the tabs 5 and the electrodes 2, 3 are numerous, while the attachment point of the tabs 5 to the electric current extracting terminal 13 is only one, it is not preferred to use the shortest ones in length respectively for each tab 5, giving rise to differences in resistance value for the tabs 5. Due to this, it is preferred to adjust the length of the tabs 5 for use to that of the tab 5 requiring the longest length, or when tabs 5 with different lengths are used, to equalize resistance values by adjusting their thickness and width.

Up until now, description has been centered on a wound-type internal electrode body 1. It goes without saying that a similar description is applicable to electrodes 8, 9 forming a lamination-type internal electrode body 7, where plural tabs are placed per plate of the electrodes 8, 9 and connectable to the electric current extracting terminal.

By adopting the above-described battery structure, especially in a large capacity battery requiring placement of numerous tabs having a battery capacity of 5 Ah or more, for example, for batteries for EV or HEV, a good charge-discharge characteristic becomes obtainable since electricity is extracted from the internal electrode bodies in the batteries equally through each tab.

The present invention is described below by way of examples. It goes without saying that the present invention is not limited by the following examples.

EXAMPLES

Measurement of Resistance of Tab

When forming the battery, at first, in order to examine resistance dispersion due to differences in methods of tab connection to the electric current extracting terminal, 30 sheets of positive tabs made of bundled aluminum foil were crimped to a positive rivet made of aluminum, using a connection method that connects the tabs 5 with a rivet 22 which is an electric current extracting terminal by crimping as shown in FIG. 4, while 30 sheets of negative tabs made of bundled copper foil were crimped to a negative rivet made of copper. Thus, a positive rivet and a negative rivet to which tabs were crimped constitute a pair. Those with a pressure for crimping of 1 ton/cm$^2$ are regarded as Example 1 and those with a pressure for crimping of 2 ton/cm$^2$ are regarded as Example 2.

Figure 6:
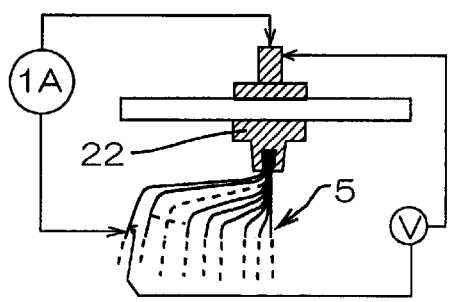
FIG. 6 is an explanatory drawing showing a method of measuring resistance of tabs according to the lithium secondary battery of the present invention.

Next, as shown in FIG. 6, the resistance value for each tab 5 was measured by measuring the voltage when a current of 1 A flowed at each tab 5 and the rivet 22. The obtained resistance values were calculated to obtain an average value, and a resistance value distribution was obtained by standardizing the resistance values for each tab 5 with the average value as 100%.

Figure 7:
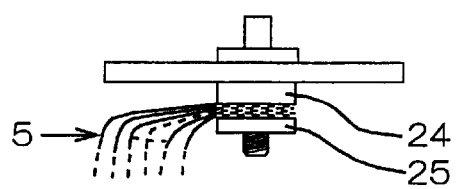
FIG. 7 is an explanatory drawing showing an embodiment of a method used to connect tabs to an electric current extracting terminal according to the lithium secondary battery of Comparative Example 2.

On the other hand, as Comparative Example 1, the tabs 5 were crimped to the rivet 22 by a similar method as adopted in the above-described Examples 1 and 2, setting pressure of 500 kg/cm$^2$ for crimping, and the resistance value of each tab 5 was measured. In addition, as Comparative Example for comparison 2, as shown in FIG. 7, the resistance value of each tab 5 was measured by a similar method as adopted in the above-described Examples 1 and 2, using an electric current extracting terminal consisting of a bolt 24 and a nut 25 without unifying the 30 sheets of the tabs 5 in advance, as shown in FIG. 5, but having a structure in which each tab 5 is individually screwed tightly.

Figure 8:
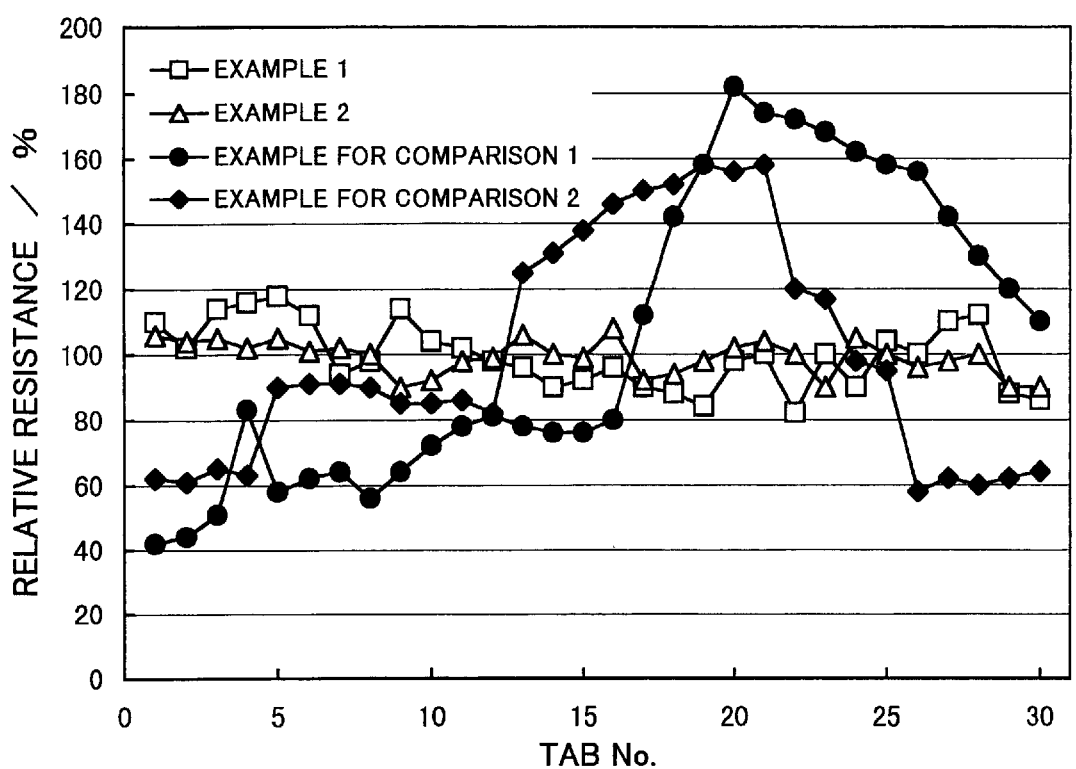
FIG. 8 is an explanatory drawing showing the dispersion in resistance of tabs according to Examples and Comparative Examples.

The dispersion in resistance values of the tabs 5 in the above-described Examples 1, 2 and Comparative Examples 1, 2 is shown in FIG. 8. Examples 1, 2 show that dispersion in resistance values of the tabs 5 is within ±20% of the average value, while Comparative Examples show that the dispersion in resistance values is larger.

Figure 9:
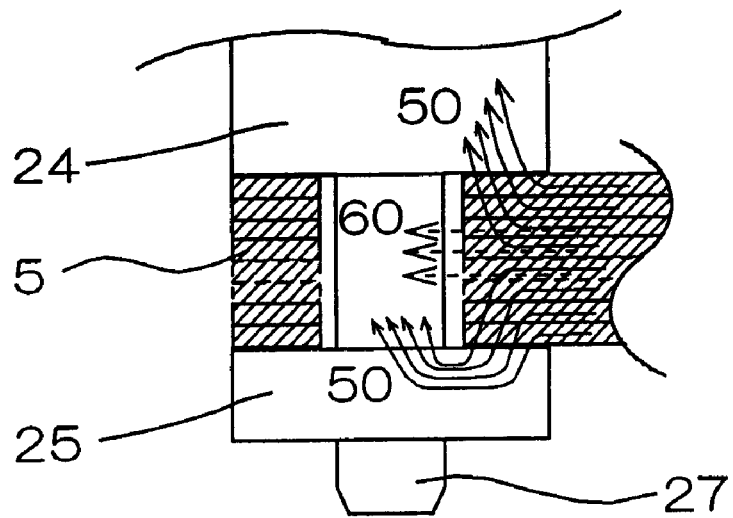
FIG. 9 is an explanatory drawing showing the flow of current from tabs to an electric current extracting terminal of a bolt and a nut.

This result can be described as follows. That is, in the case of Comparative Example 2 where the bolt 24 and the nut 25 were used, as shown in FIG. 9, the tabs 5 are provided with a hole to insert them into the screw thread 27 of the bolt 24, the diameter of the hole being larger than the diameter of the screw thread 27 of the bolt 24, and further the area where the side surface of the hole of the tabs 5 contacts the screw thread 27 being fairly small due to the thinness of the tabs 5. Therefore, the current of each tab 5 flows toward the bolt 24 through an adjacent tab 5, as shown by the arrow 50, or to the bolt 24 through an adjacent tab 5 and the nut 25, making it difficult for it to flow in the direction shown by the arrow 60.

Figure 10:
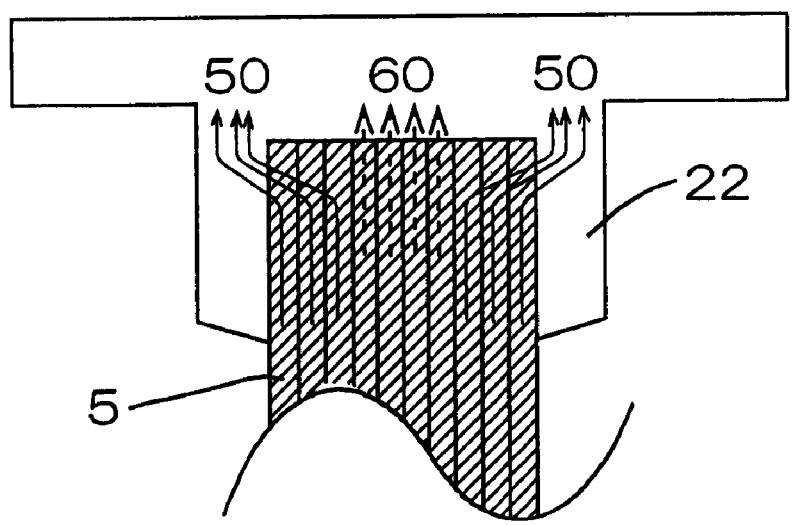
FIG. 10 is an explanatory drawing showing the flow of current from tabs to an electric current extracting terminal of a rivet.

On the other hand, as in the case of Examples 1, 2 and Comparative Example 1, the case of using the rivet 22 is similar. In this case shown in FIG. 10, the current of each tab 5 flows toward the direction shown by the arrow 50, namely to the rivet 22 through an adjacent tab 5 since the area where the side surface of a tab 5 contacts the rivet 22 is fairly small, thus making it difficult for the current to flow in the direction shown by the arrow 60.

That is, in any case of the above-described Examples 1, 2, and Comparative Examples 1, 2, the current is to flow through the contact surface between the tabs 5. Due to this, among the bundled tabs 5, ones located in the center will yield larger resistance values since there are more contact surfaces with the bolt 24 or the rivet 22.

Therefore, it is necessary to reduce the resistance of the contact surfaces occurring at each tab 5 so that dispersion in resistance values of the respective tabs 5 is reduced. Here it is known that for tabs made of aluminum foil, an insulating film of alumina is apt to be formed on its surface, and as the number of bundled thin-band-shaped tabs 5 increases, the insulating film will have more effect on the resistance distribution of the tabs 5. Under the circumstances, it is necessary to destroy the insulating film, and thereby ensure contact at the metal material portion originating in the tab so as to reduce dispersion in resistance values of the tabs 5.

This is applicable to tabs made of copper foil. Nevertheless, since the oxide film to be generated on the surface of copper foil is a semiconductor, the contact surfaces are affected to a smaller extent than in the case where the aluminum foil is used. However, concerning the conductivity of electrons, since metal is naturally superior to a semiconductor, with regard to copper foil as well, it is preferable to ensure the contact between metals by destroying the oxide film on the surfaces.

Therefore, a method capable of ensuring metal-to-metal contact by crimping, etc., is preferable for connecting the tabs 5 to the electric current extracting terminal. In Examples 1, 2, it is thought that the dispersion in resistance of the tabs 5 was suppressed as a result of contact having been ensured between the metal materials with the oxide films on the surfaces of the tabs 5 having been destroyed by conducting crimping at an appropriate pressure. Nevertheless, it is thought that even if a crimping is used, as shown in the result of Comparative Example 1, in the case where the pressure of the crimping is low and inappropriate, dispersion in resistance of the connection of tabs 5 will increase, making the effect of crimping unobtainable. In addition, with Comparative Example 2, it is thought that with the clamp pressure for screwing it will be difficult to reach the necessary pressure to enable the oxide film on the tabs 5 to be destroyed, and as a result it is presumed that the dispersion of resistance will become larger.

Incidentally, in order to limit dispersion in the resistance values of the tabs 5 within an average value of ±20%, in the case where aluminum foil is used as the tabs 5, the pressure of crimping had to be within the range from 1 ton/cm$^2$ to 50 ton/cm$^2$, while in the case where copper foil is used, the pressure of the crimping had to be within the range from 500 kg/cm$^2$ to 100 ton/cm$^2$.

Thus, one of the reasons contributing to differences in the required range of pressure between aluminum foil and copper foil to limit dispersion in resistance values within a given range is thought to be due to the fact that an oxide film is more easily formed in an aluminum foil than in a copper foil, as well as due to the above-described difference in the electric characteristic of the oxide film. Incidentally, the upper limit of pressure for crimping for each tab 5 is the pressure when damage such as cuts on the tab 5 take place at the end portions of the rivet 22.

Forming of Battery

A lithium secondary battery was formed by the method described below. At first, a paste was formed with a $LiMn_2O_4$ powder body as a positive active material, to which acetylene black was added to provide conductivity to it, and further a binder and a solvent were mixed therein. With this paste being coated on both sides of 20 $\mu$m-thick aluminum foil, a positive electrode was formed having an electrode plane shape with a length towards the winding direction of 3600 mm×a width of 200 mm. On the other hand, a paste was formed with a highly graphitized carbon powder as a positive active material, and further a binder and a solvent are mixed therein, which is then coated on both sides of 10 $\mu$m-thick copper foil, and thereby a negative electrode was formed having an electrode plane shape with a length towards the winding direction of 4000 mm×a width of 200 mm.

Next, as shown in FIG. 11, the thus-formed positive electrode 2 and negative electrode 3 were wound with insulation being provided employing 210 mm-wide separators 4 made of polypropylene. At the same time 30 sheets each of positive tabs 5A made of aluminum and negative tabs 5B made of copper which were used in the above-described Example 1, etc., were attached to the electrodes 2, 3 by ultrasonic-welding so that they were arranged to make an approximately straight line along the direction of the diameter of the internal electrode body 1, and so that each electrode 2, 3 was placed with an approximate distance in between when they were spread out, and further so that one of the electrodes was formed at one end of the internal electrode body 1.

The thus formed internal electrode body 1 was fitted into the aluminum-made battery case 17, crimping each positive tab and negative tab 5A, 5B to the positive electrode and negative electrode rivets 22A, 22B respectively, which are the electric current extracting terminals, under a pressure of 1 ton/cm$^2$, using the same method as in the above-described Example 1, attaching a battery cap onto the negative rivet 22B to seal the negative side of the battery case 17. Thereafter, from the open side of the positive terminal of the battery case 17, the electrolyte, a mixed solvent of EC (ethylene carbonate) and DEC (diethyl carbonate) where electrolyte $LiPF_6$ was dissolved to yield 1 mol % density was injected into the battery case 17. Thereafter, a battery cap was attached onto the positive rivet 22A to tightly seal the battery case 17. Incidentally, the battery case 17 may be sealed from the positive side.

Thus, the battery formed using the method of connecting the tabs to the electric current extracting terminal in the above-described Example 1 is deemed to be the battery for the Example 1.

Subsequently, respective batteries were formed, using the above-described Example 2 and Comparative Examples 1, 2 as the method for connecting the tabs to the electric current extracting terminal in the same way as in the battery for Example 1, except for the method used to connect the tabs to the electric current extracting terminal. The thus-formed batteries are deemed to be the battery for Example 2, the battery for Comparative Example 1, and the battery for Comparative Example 2 respectively.

The battery capacity of the formed batteries was 25 Ah, and their charge-discharge characteristic was assessed by a cycle operation test. Here, charging was conducted at a constant current of 25 A and a constant voltage of 4.1 V, and discharging was conducted with constant current at a discharge rate of 1 C (25 A) until discharge was finalized at 2.5 V, whereupon charging/discharging was repeated. The discharge capacity for each time was standardized using the discharge capacity at the first time as 100%.

Figure 12:
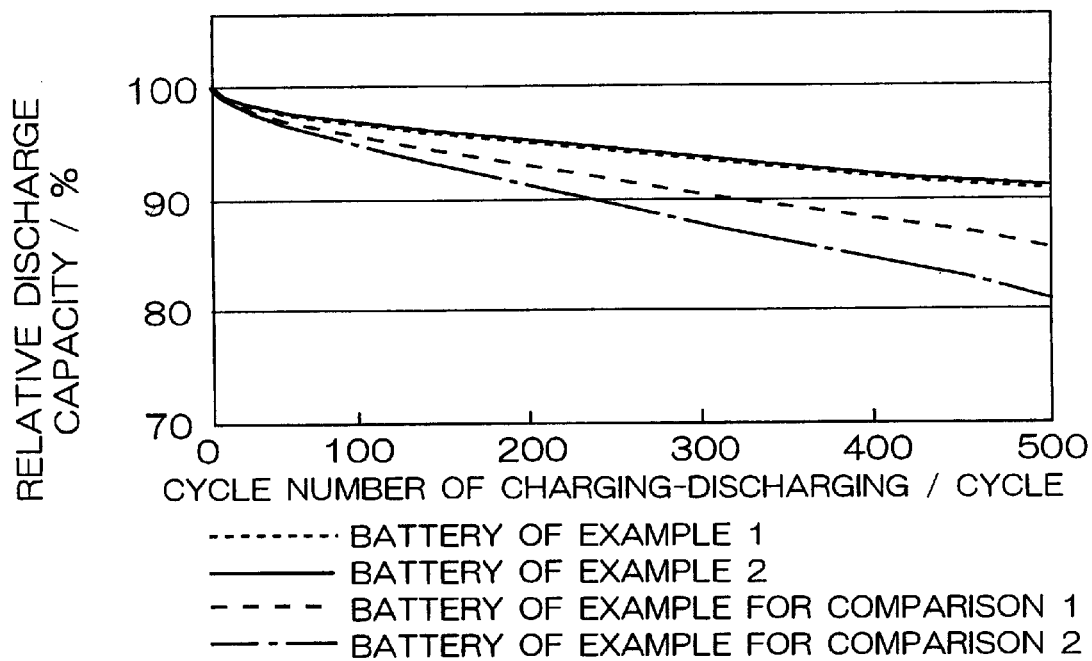
FIG. 12 is an explanatory drawing showing the test results of cycle operations on an Example and Examples for comparison.

FIG. 12 shows how the discharge capacity changed during the cycle operation test. For the batteries for Examples 1, 2 where the dispersion in resistance of the tabs was small, the capacity drop was small, and there were no major differences between the two. On the other hand, for the batteries for Comparative Example 2, where the dispersion in resistance of the tabs was large, the capacity drop was remarkable. Such a result is thought to be caused by unevenness that occurred in the battery reaction in the internal electrode body due to dispersion in resistance of the tabs, and deterioration which occurred partially in the positive electrodes and negative electrodes.

As described above, the lithium secondary battery of this invention yields an excellent effect in that it is possible to discharge a huge electric current constantly, enabling uniform electricity collection from the positive electrodes and negative electrodes together with a uniform battery reaction within the positive electrodes and negative electrodes, since any inconsistency in the resistance of multiple tabs is limited within a certain range. As a result of this, it also yields another excellent effect in that local deterioration of battery materials may be suppressed and thus excellent endurance may be provided during cycle operations.

What is claimed is:

1. A lithium secondary battery comprising:
   a battery case;
   an internal electrode body contained in the battery case and including a positive electrode, a negative electrode and a separator made of porous polymer, the positive electrode and the negative electrode being wound or laminated so that the positive electrode and negative electrode prevented by the separator from coming into direct contact with each other;
   multiple tabs for electricity collection;
   a positive terminal; and
   a negative terminal,
   each of said multiple tabs being connected at a first end to the positive electrode or the negative electrode and a second end to said positive terminal or said negative terminal, respectively, each of said multiple tabs having a resistance value set to remain within a range of ±20% of an average resistance value of the tabs, said resistance value of each tab being measured between said first end and the terminal to which said second end is connected.

2. A lithium secondary battery according to claim 1, wherein all the positive tabs are connected to said positive terminal by crimping or welding, and all the negative tabs are connected to said negative terminal by crimping or welding.

3. A lithium secondary battery according to claim 1, wherein all the positive tabs are unified by crimping or welding or eyelet-type connecting in advance and are thereafter connected to said positive terminal by crimping or welding or screwing, and all the negative tabs are unified by crimping or welding or eyelet-type connecting in advance, and are thereafter connected to said negative terminal by crimping or welding or screwing.

4. A lithium secondary battery according to claim 1, wherein each said tab has a thickness within a range from 5 μm to 100 μm.

5. A lithium secondary battery according to claim 1, wherein battery capacity is not less than 5 Ah.

6. A lithium secondary battery according to claim 1, wherein the battery is used for an electric vehicle or a hybrid electric vehicle.

* * * * *